US007004842B2

(12) United States Patent
Fairchild et al.

(10) Patent No.: US 7,004,842 B2
(45) Date of Patent: Feb. 28, 2006

(54) COMPOUND DRIVESHAFT ASSEMBLY WITH CONSTANT VELOCITY JOINT

(75) Inventors: Scott M. Fairchild, Monroe, MI (US); D. Dennis Wang, Perrysburg, OH (US)

(73) Assignee: Torque-Traction Technologies, Inc., Maumee, OH (US)

( * ) Notice: Subject to any disclaimer, the term of this patent is extended or adjusted under 35 U.S.C. 154(b) by 1 day.

(21) Appl. No.: 10/356,620

(22) Filed: Jan. 31, 2003

(65) Prior Publication Data

US 2004/0152527 A1  Aug. 5, 2004

(51) Int. Cl.
F16D 3/18 (2006.01)

(52) U.S. Cl. .................. 464/140; 464/906

(58) Field of Classification Search ........... 464/145, 464/141, 146, 143, 178, 183, 906, 162, 140; 180/379, 382, 383, 384; 74/15.8–15.88
See application file for complete search history.

(56) References Cited

U.S. PATENT DOCUMENTS

| 3,367,139 | A |   | 2/1968  | Ristau |
| 4,132,422 | A |   | 1/1979  | Sankey et al. |
| 4,371,049 | A | * | 2/1983  | Goeft et al. ............ 464/145 X |
| 4,392,839 | A |   | 7/1983  | Aucktor |
| 4,608,028 | A |   | 8/1986  | Welschof et al. |
| 4,846,764 | A |   | 7/1989  | Hazebrook et al. |
| 5,067,929 | A |   | 11/1991 | Krude |
| 5,221,233 | A |   | 6/1993  | Jacob |
| 5,451,185 | A | * | 9/1995  | Krude et al. ................ 464/145 |
| 5,582,546 | A | * | 12/1996 | Welschof .................... 464/906 |
| 5,632,683 | A |   | 5/1997  | Fukumura et al. |
| 5,647,802 | A |   | 7/1997  | Gleasman et al. |
| 5,725,453 | A | * | 3/1998  | Zalewski et al. |
| 5,802,705 | A |   | 9/1998  | Carlini |
| 5,823,883 | A |   | 10/1998 | Hopson |
| 5,911,286 | A |   | 6/1999  | Boutin |
| 6,132,316 | A |   | 10/2000 | Statham |
| 6,152,825 | A | * | 11/2000 | Doell ......................... 464/906 |
| 6,206,785 | B1 |   | 3/2001  | Thomas |
| 6,273,825 | B1 |   | 8/2001  | Schwarzler et al. |

(Continued)

FOREIGN PATENT DOCUMENTS

EP            1188944          3/2002

(Continued)

*Primary Examiner*—Greg Binda
(74) *Attorney, Agent, or Firm*—MacMillan, Sobanski & Todd, LLC

(57) ABSTRACT

A compound driveshaft assembly includes a first driveshaft section that is connected through a front stub shaft to an inner race of a constant velocity universal joint. The constant velocity universal joint includes a unitary outer race and splined member having an outer race portion that is disposed about the inner race and a splined portion that extends axially rearwardly from the outer race portion. The unitary outer race and splined member is formed from a single piece of material, not from an assembly of two or more separate components. A plurality of balls provide a driving connection between the outer race portion of the unitary outer race and splined member and the inner race. The splined portion of the unitary outer race and splined member is connected for rotation with a rear stub shaft. To accomplish this, the rear stub shaft includes a splined portion that cooperates with the splined portion of the unitary outer race and splined member. The rear stub shaft is connected to a front end of a second driveshaft section. The second driveshaft section has a rear end that is connected through a second universal joint to the input shaft of the axle assembly.

18 Claims, 3 Drawing Sheets

U.S. PATENT DOCUMENTS

| | | | |
|---|---|---|---|
| 6,280,337 B1 | 8/2001 | Wormsbacher et al. | |
| 6,280,340 B1 * | 8/2001 | Masuda | 464/906 |
| 2001/0049309 A1 * | 12/2001 | Perrow | 464/146 |

FOREIGN PATENT DOCUMENTS

| | | |
|---|---|---|
| EP | 1190870 | 3/2002 |

* cited by examiner

COMPOUND DRIVESHAFT ASSEMBLY WITH CONSTANT VELOCITY JOINT

BACKGROUND OF THE INVENTION

The invention relates in general to driveshaft assemblies, such as are commonly found in the drive train systems of most vehicles. In particular, this invention relates to an improved structure for a compound driveshaft assembly that includes an intermediate constant velocity joint and that is relatively simple and inexpensive to manufacture.

Drive train systems are widely used for generating power from a source and for transferring such power from the source to a driven mechanism. Frequently, the source generates rotational power, and such rotational power is transferred from the source to a rotatably driven mechanism. For example, in most land vehicles in use today, an engine/transmission assembly generates rotational power, and such rotational power is transferred from an output shaft of the engine/transmission assembly through a driveshaft assembly to an input shaft of an axle assembly so as to rotatably drive the wheels of the vehicle. To accomplish this, a typical driveshaft assembly includes a hollow cylindrical driveshaft tube having front and rear end fittings, such as a pair of tube yokes, that are respectively secured to the front and rear ends thereof. The front end fitting forms a portion of a front universal joint that connects the output shaft of the engine/transmission assembly to the front end of the driveshaft tube. Similarly, the rear end fitting forms a portion of a rear universal joint that connects the rear end of the driveshaft tube to the input shaft of the axle assembly. The front and rear universal joints provide a rotational driving connection from the output shaft of the engine/transmission assembly through the driveshaft tube to the input shaft of the axle assembly, while accommodating a limited amount of angular misalignment between the rotational axes of these three shafts.

In some vehicles, the distance separating the engine/transmission assembly and the axle assembly is relatively short. For these vehicles, the driveshaft assembly can be formed from a single, relatively long driveshaft tube having the front and rear end fittings respectively secured to the front and rear ends thereof, as described above. In other vehicles, however, the distance separating the engine/transmission assembly and the axle assembly is relatively long, making the use of a single driveshaft tube impractical. For these vehicles, the driveshaft assembly can be formed from first and second separate, relatively short driveshaft sections. In a compound driveshaft assembly such as this, the front end fitting is secured to a front end of the first driveshaft section and forms a portion of the front universal joint, as described above. Similarly, the rear end fitting is secured to a rear end of the second driveshaft section and forms a portion of the rear universal joint, as also described above. An intermediate universal joint is provided for connecting the rear end of the first driveshaft section to the front end of the rear driveshaft section for rotational movement. A compound driveshaft assembly that is composed of two or more separate driveshaft sections usually requires the use of a structure for supporting the intermediate portions thereof for rotation during use, such as a conventional center bearing assembly.

Traditionally, the various universal joints used in both regular and compound driveshaft assemblies have been cardan type universal joints. In a typical cardan type universal joint, each of the end fittings is embodied as a yoke that includes a body portion having a pair of opposed arms extending therefrom. A cross is provided with a central body portion having four cylindrical trunnions extending outwardly therefrom. The trunnions are oriented in a single plane and extend at right angles relative to one another, and a hollow cylindrical bearing cup is mounted on the end of each of the trunnions. Needle bearings or other friction-reducing structures are provided between the outer cylindrical surfaces of the trunnions and the inner cylindrical surfaces of the bearing cups to permit rotational movement of the bearing cups relative to the trunnions during operation of the universal joint. The bearing cups supported on the first opposed pair of the trunnions of the cross are connected to the opposed arms of the first yoke, while the bearing cups supported on the second opposed pair of the trunnions of the cross are connected to the opposed arms of the second yoke.

More recently, however, one or more of the various universal joints used in both regular and compound driveshaft assemblies have been constant velocity type universal joints. A typical constant velocity universal joint includes a cylindrical inner race that is connected to one of the shafts and a hollow cylindrical outer race that is connected to the other of the shafts. The outer surface of the inner race and the inner surface of the outer race have respective pluralities of grooves formed therein. Each groove formed in the outer surface of the inner race is associated with a corresponding groove formed in the inner surface of the outer race. A ball is disposed in each of the associate pairs of grooves. The balls provide a driving connection between the inner and outer races. An annular cage is typically provided between the inner and outer races for retaining the balls in the grooves. The cage is provided with a plurality of circumferentially spaced openings for this purpose.

Although the use of constant velocity joints in both regular and compound driveshaft assemblies has been effective, they have been found to be relatively complex and expensive to manufacture, particularly in the context of a compound driveshaft assembly. Thus, it would be desirable to provide an improved structure for a compound driveshaft assembly that includes an intermediate constant velocity joint and that is relatively simple and inexpensive to manufacture.

SUMMARY OF THE INVENTION

This invention relates to an improved structure for a compound driveshaft assembly that includes an intermediate constant velocity joint and that is relatively simple and inexpensive to manufacture. The driveshaft assembly includes a first driveshaft section having a rear end that is secured to a front stub shaft. The front stub shaft extends includes a bearing portion having a male splined portion extending axially therefrom. A center bearing assembly extends about the bearing portion of the front stub shaft and supports it, as well as the remainder of the driveshaft assembly, for rotation during use. The first embodiment further includes a constant velocity universal joint that includes a unitary outer race and splined member and an inner race. The unitary outer race and splined member includes an outer race portion that is disposed about the inner race and a splined portion that extends axially rearwardly from the outer race portion. The unitary outer race and splined member is formed from a single piece of material, not from an assembly of two or more separate components. A plurality of balls provide a driving connection between the outer race portion of the unitary outer race and splined member and the inner race. The splined portion of the unitary outer race and splined member is connected for rotation with a rear stub shaft. To accomplish this, the rear stub shaft includes a splined portion that cooperates with the splined portion of the unitary outer race and splined member. The rear stub shaft is connected to a front end of a second driveshaft section. The second driveshaft section has a rear end that is connected through a second universal joint to the input shaft of the axle assembly.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
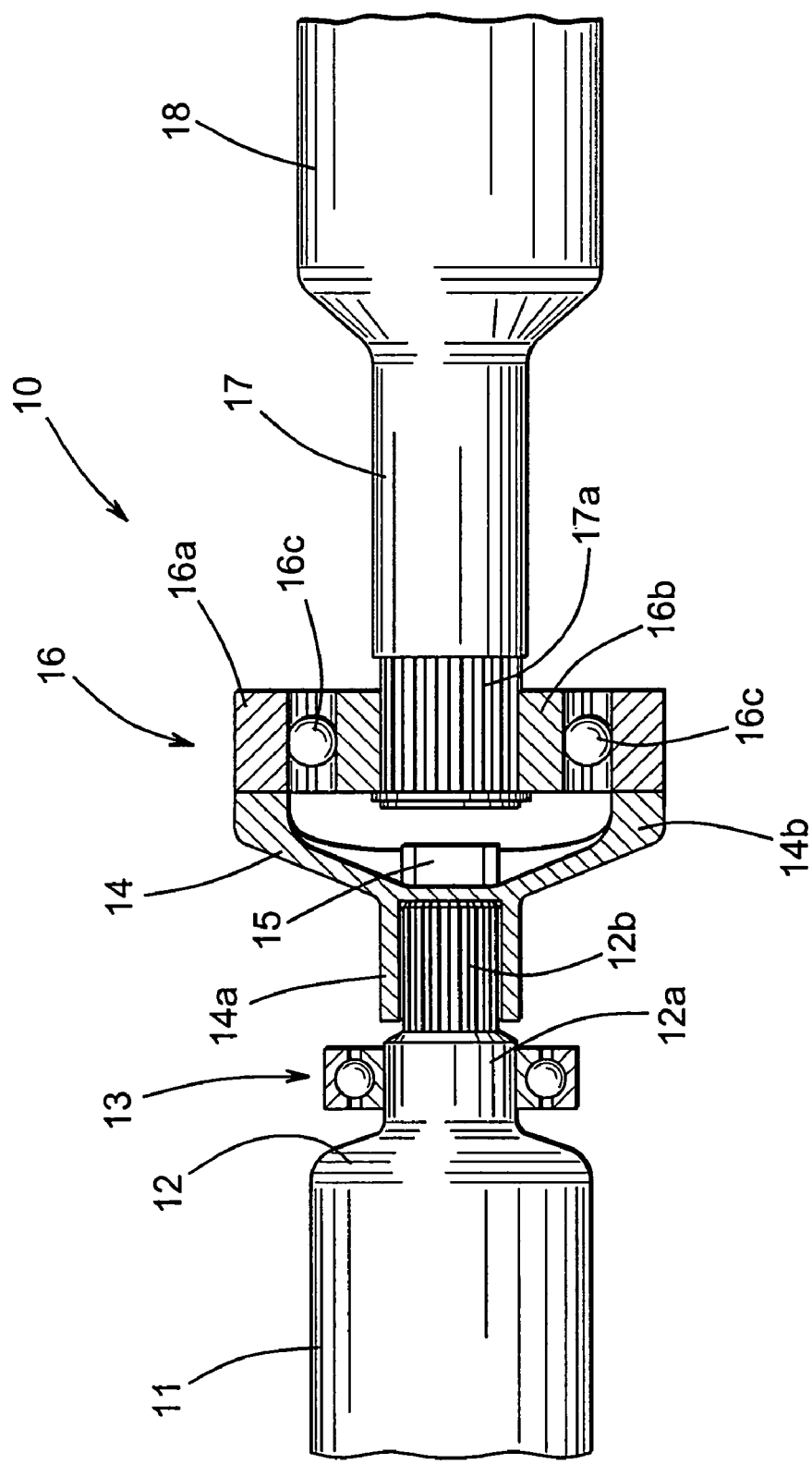
FIG. 1 is a side elevational view, partially in cross section, of a portion of a prior art driveshaft assembly that can be used, for example, in a drive train system for a vehicle.

Referring now to the drawings, there is illustrated in FIG. 1 a portion of a prior art driveshaft assembly, indicated generally at 10, that has been used, for example, in a drive train system for a vehicle. The prior art driveshaft assembly 10 has been used to transmit rotational power from an output shaft of an engine/transmission assembly (not shown) to an input shaft of an axle assembly (not shown) so as to rotatably drive the wheels of the vehicle. To accomplish this, the prior art driveshaft assembly 10 includes a first driveshaft section 11 having a front end (not shown) that is connected through a first universal joint (not shown) to the output shaft of the engine/transmission assembly. A rear end of the first driveshaft section 11 is secured, such as by welding, to a front stub shaft 12. The front stub shaft 12 extends rearwardly from the first driveshaft section 11 and includes a bearing portion 12a having a male splined portion 12b extending axially therefrom. A conventional center bearing assembly, schematically illustrated generally at 13, extends about the bearing portion 12a of the front stub shaft 12. In a manner that is well known in the art, the center bearing assembly 13 is secured to a support surface (not shown), such as a portion of a frame of the vehicle. The center bearing assembly 13 engages the bearing portion 12a of the front stub shaft 12 to support it, as well as the remainder of the driveshaft assembly 10, for rotation during use. The male splined portion 12b of the front stub shaft 12 has a companion flange 14 secured thereto. The companion flange 14 includes a female splined body portion 14a that cooperates with the male splined portion 12b of the stub shaft 12 for concurrent rotation. The companion flange 14 further includes a flange portion 14b that extends axially from the female splined body portion 14a. A threaded fastener 15 is provided to secure the companion flange 14 to the male splined portion 12b of the front stub shaft 12.

The prior art driveshaft assembly 10 further includes a constant velocity universal joint, indicated generally at 16, that includes an outer race 16a and an inner race 16b. The inner surface of the outer race 16a and the outer surface of the inner race 16b have respective pluralities of grooves formed therein. Each groove formed in the inner surface of the outer race 16a is associated with a corresponding groove formed in the outer surface of the inner race 16b. A ball 16c is disposed in each of the associate pairs of grooves. The balls 16c provide a driving connection between the outer race 16a and the inner race 16b. An annular cage (not shown) is typically provided between the outer race 16a and the inner race 16b for retaining the balls 16c in the grooves. In a constant velocity universal joint 16 such as illustrated, the instantaneous angular velocities of the outer race 16a and the inner race 16b are always equal, regardless of the angle of articulation therebetween.

The flange portion 14b of the companion flange 14 is connected for rotation with the outer race 16a of the constant velocity joint 16, such as by welding, threaded fasteners, and the like. The inner race 16b of the constant velocity joint 16 is connected for rotation with a rear stub shaft 17. To accomplish this, the rear stub shaft 17 includes a male splined portion 17a that extends within a female splined portion of the inner race 16b of the constant velocity joint 16. The rear stub shaft 17 is connected, such as by welding, to a front end of a second driveshaft section 18. The second driveshaft section 18 has a rear end (not shown) that is connected through a second universal joint (not shown) to the input shaft of the axle assembly.

Figure 2:
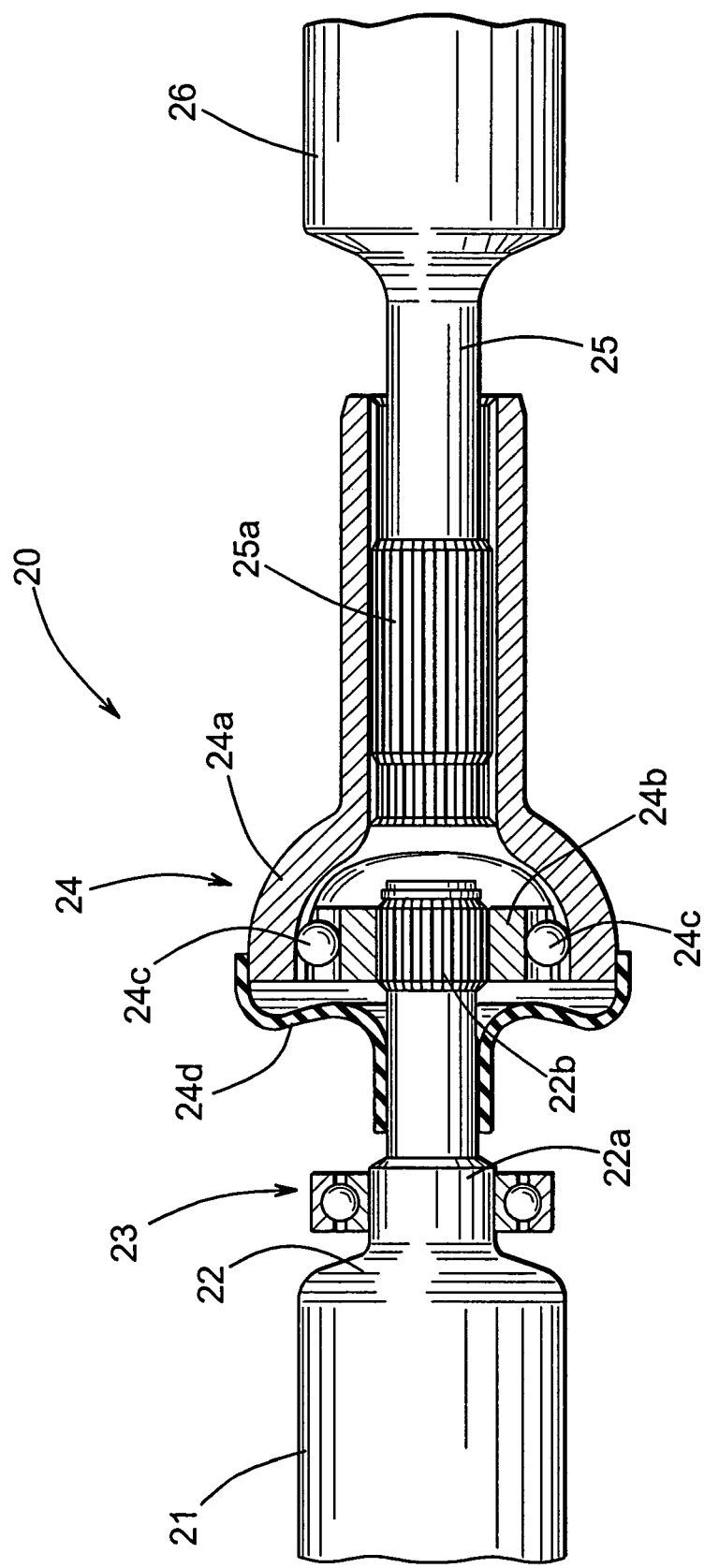
FIG. 2 is a side elevational view, partially in cross section, of a first embodiment of a driveshaft assembly in accordance with this invention that can be used, for example, in a drive train system for a vehicle.

Referring now to FIG. 2, there is illustrated a portion of a first embodiment of a driveshaft assembly, indicated generally at 20, in accordance with this invention that can be used, for example, in a drive train system for a vehicle to transmit rotational power from an output shaft of an engine/transmission assembly (not shown) to an input shaft of an axle assembly (not shown) so as to rotatably drive the wheels of the vehicle. Although this invention will be described and illustrated in the context of a vehicular drive train system, it will be appreciated that the scope of this invention is not intended to be limited to this specific environment. On the contrary, as will become apparent below, this invention may be used in any other desired environment.

The first embodiment of the driveshaft assembly 20 includes a first driveshaft section 21 having a front end (not shown) that is connected through a first universal joint (not shown) to the output shaft of the engine/transmission assembly. A rear end of the first driveshaft section 21 is secured, such as by welding, to a front stub shaft 22. The front stub shaft 22 extends rearwardly from the first driveshaft section 21 and includes a bearing portion 22a having a male splined portion 22b extending axially therefrom. A conventional center bearing assembly, schematically illustrated generally at 23, extends about the bearing portion 22a of the front stub shaft 22. In a manner that is well known in the art, the center bearing assembly 23 is secured to a support surface (not shown), such as a portion of a frame of the vehicle. The center bearing assembly 23 engages the bearing portion 22a of the front stub shaft 22 to support it, as well as the remainder of the driveshaft assembly 20, for rotation during use.

The first embodiment of the driveshaft assembly 20 further includes a constant velocity universal joint, indicated generally at 24, that includes a unitary outer race and female splined member 24a and an inner race 24b. As shown in FIG. 2, the unitary outer race and female splined member 24a includes an outer race portion that is disposed about the inner race 24b and a female splined portion that extends axially rearwardly from the outer race portion. The unitary outer race and female splined member 24a is formed from a single piece of material, not from an assembly of two or more separate components. For example, the unitary outer race and female splined member 24a can be formed by casting a preform having an unfinished shape that roughly approximates the desired final shape thereof. After being cast, the unfinished preform can be machined to a desired final shape. However, the unitary outer race and female splined member 24a can be formed in any desired manner.

The inner surface of the outer race portion of the unitary outer race and female splined member 24a and the outer surface of the inner race 24b have respective pluralities of grooves formed therein. Each groove formed in the inner surface of the outer race portion of the unitary outer race and female splined member 24a is associated with a corresponding groove formed in the outer surface of the inner race 24b. A ball 24c is disposed in each of the associate pairs of grooves. The balls 24c provide a driving connection between the unitary outer race and female splined member 24a and the inner race 24b. An annular cage (not shown) can be provided between the unitary outer race and female splined member 24a and the inner race 24b for retaining the balls 24c in the grooves. A flexible boot 24d or other sealing structure can extend from the outer race portion of the unitary outer race and female splined member 24a and a portion of the front stub shaft 22 to prevent dirt, water, and other contaminants from entering into the constant velocity joint 24. In a constant velocity universal joint 24 such as illustrated, the instantaneous angular velocities of the integral outer race and female splined member 24a and the inner race 24b are always equal, regardless of the angle of articulation therebetween.

As mentioned above, the female splined portion of the unitary outer race and female splined member 24a extends axially rearwardly from the outer race portion. The female splined portion of the unitary outer race and female splined member 24a is connected for rotation with a rear stub shaft 25 for relative axial movement in a well known manner. To accomplish this, the rear stub shaft 25 includes a male splined portion 25a that extends within the female splined portion of the unitary outer race and female splined member 24a. The rear stub shaft 25 is connected, such as by welding, to a front end of a second driveshaft section 26. The second driveshaft section 26 has a rear end (not shown) that is connected through a second universal joint (not shown) to the input shaft of the axle assembly.

Figure 3:
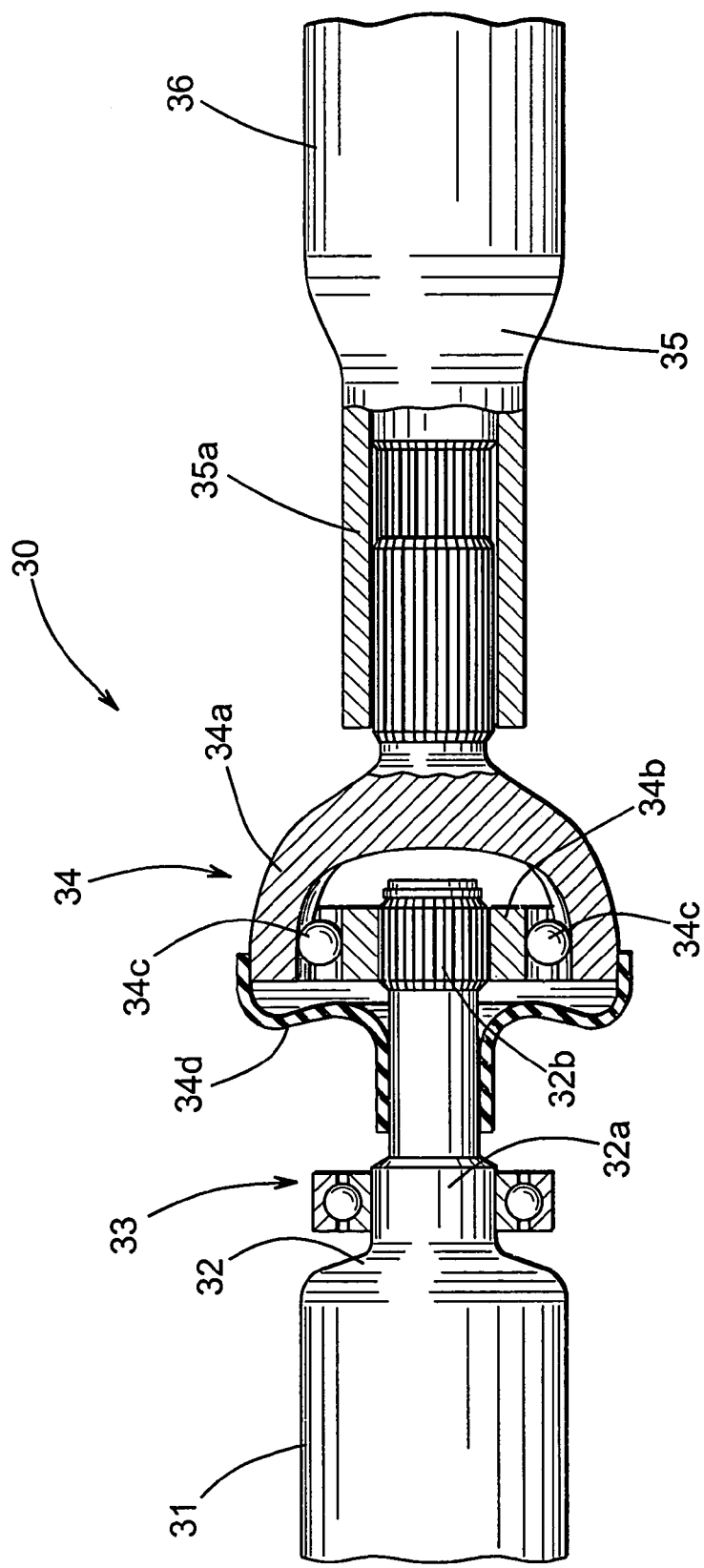
FIG. 3 is a side elevational view, partially in cross section, of a second embodiment of a driveshaft assembly in accordance with this invention that can be used, for example, in a drive train system for a vehicle.

Referring now to FIG. 3, there is illustrated a portion of a second embodiment of a driveshaft assembly, indicated generally at 30, in accordance with this invention that can be used, for example, in a drive train system for a vehicle to transmit rotational power from an output shaft of an engine/transmission assembly (not shown) to an input shaft of an axle assembly (not shown) so as to rotatably drive the wheels of the vehicle. The second embodiment of the driveshaft assembly 30 includes a first driveshaft section 31 having a front end (not shown) that is connected through a first universal joint (not shown) to the output shaft of the engine/transmission assembly. A rear end of the first driveshaft section 31 is secured, such as by welding, to a front stub shaft 32. The front stub shaft 32 extends rearwardly from the first driveshaft section 31 and includes a bearing portion 32a having a male splined portion 32b extending axially therefrom. A conventional center bearing assembly, schematically illustrated generally at 33, extends about the bearing portion 32a of the front stub shaft 32. In a manner that is well known in the art, the center bearing assembly 33 is secured to a support surface (not shown), such as a portion of a frame of the vehicle. The center bearing assembly 23 engages the bearing portion 32a of the front stub shaft 32 to support it, as well as the remainder of the driveshaft assembly 30, for rotation during use.

The second embodiment of the driveshaft assembly 30 further includes a constant velocity universal joint, indicated generally at 34, that includes a unitary outer race and male splined member 34a and an inner race 34b. As shown in FIG. 3, the unitary outer race and male splined member 34a includes an outer race portion that is disposed about the inner race 34b and a male splined portion that extends axially rearwardly from the outer race portion. The unitary outer race and male splined member 34a is formed from a single piece of material, not from an assembly of two or more separate components. For example, the unitary outer race and male splined member 34a can be formed by casting a preform having an unfinished shape that roughly approximates the desired final shape thereof. After being cast, the unfinished preform can be machined to a desired final shape. However, the unitary outer race and male splined member 34a can be formed in any desired manner.

The inner surface of the outer race portion of the unitary outer race and male splined member 34a and the outer surface of the inner race 34b have respective pluralities of grooves formed therein. Each groove formed in the inner surface of the outer race portion of the unitary outer race and male splined member 34a is associated with a corresponding groove formed in the outer surface of the inner race 34b. A ball 34c is disposed in each of the associate pairs of grooves. The balls 34c provide a driving connection between the unitary outer race and male splined member 34a and the inner race 34b. An annular cage (not shown) can be provided between the unitary outer race and male splined member 34a and the inner race 34b for retaining the balls 34c in the grooves. A flexible boot 34d or other sealing structure can extend from the outer race portion of the unitary outer race and male splined member 34a and a portion of the front stub shaft 32 to prevent dirt, water, and other contaminants from entering into the constant velocity joint 34. In a constant velocity universal joint 34 such as illustrated, the instantaneous angular velocities of the integral outer race and male splined member 34a and the inner race 34b are always equal, regardless of the angle of articulation therebetween.

As mentioned above, the male splined portion of the unitary outer race and male splined member 34a extends axially rearwardly from the outer race portion. The male splined portion of the unitary outer race and female splined member 34a is connected for rotation with a rear stub shaft 35. To accomplish this, the rear stub shaft 35 includes a female splined portion 35a that extends about the male splined portion of the unitary outer race and male splined member 34a. The rear stub shaft 35 is connected, such as by welding, to a front end of a second driveshaft section 36. The second driveshaft section 36 has a rear end (not shown) that is connected through a second universal joint (not shown) to the input shaft of the axle assembly.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:
1. A compound driveshaft assembly comprising:
 a first driveshaft section;
 a center bearing assembly that supports said first driveshaft section for rotation;

a constant velocity universal joint including an inner race, a unitary outer race and splined member, and a plurality of balls, said inner race being connected for rotation with said first driveshaft section, said unitary outer race and splined member being formed from a single piece of material and including an outer race portion that is disposed about said inner race and a splined portion that extends from said outer race portion, said plurality of balls provide a driving connection between said inner race and said outer race portion of said unitary outer race and splined member; and a second driveshaft section connected for rotation with and for relative axial movement to said splined portion of said unitary outer race and splined member.

2. The compound driveshaft assembly defined in claim 1 further including a stub shaft that is connected between said first driveshaft section and said inner race of said constant velocity universal joint.

3. The compound driveshaft assembly defined in claim 2 wherein said stub shaft includes a first end that is connected to said first driveshaft section and a second end having a splined portion that is connected to said inner race of said constant velocity universal joint.

4. The compound driveshaft assembly defined in claim 1 further including a stub shaft that is connected between said splined portion of said unitary outer race and splined member and said second driveshaft section.

5. The compound driveshaft assembly defined in claim 4 wherein said stub shaft includes a first end having a splined portion that is connected to said splined portion of said unitary outer race and splined member and a second end that is connected to said second driveshaft section.

6. The compound driveshaft assembly defined in claim 1 wherein said splined portion of said unitary outer race and splined member includes a female splined portion that extends from said outer race portion.

7. The compound driveshaft assembly defined in claim 6 further including a stub shaft that is connected between said female splined portion of said unitary outer race and splined member and said second driveshaft section.

8. The compound driveshaft assembly defined in claim 7 wherein said stub shaft includes a first end having a male splined portion that is connected to said female splined portion of said unitary outer race and splined member and a second end that is connected to said second driveshaft section.

9. The compound driveshaft assembly defined in claim 1 wherein said unitary outer race and splined member includes a male splined portion that extends from said outer race portion.

10. The compound driveshaft assembly defined in claim 9 further including a stub shaft that is connected between said male splined portion of said unitary outer race and splined member and said second driveshaft section.

11. The compound driveshaft assembly defined in claim 10 wherein said stub shaft includes a first end having a female splined portion that is connected to said male splined portion of said unitary outer race and splined member and a second end that is connected to second first driveshaft section.

12. The compound driveshaft assembly defined in claim 2 wherein said center bearing assembly engages said stub shaft and supports said first driveshaft section and said stub shaft for rotation.

13. A compound driveshaft assembly comprising:

a first driveshaft section;

a first stub shaft having a first end that is secured to said first driveshaft section and a second end;

a center bearing assembly that engages said first stub shaft and supports said first driveshaft section and said first stub shaft for rotation;

a constant velocity universal joint including an inner race, a unitary outer race and splined member, and a plurality of balls, said inner race being connected for rotation with said second end of said first stub shaft, said unitary outer race and splined member being formed from a single piece of material and including an outer race portion that is disposed about said inner race and a splined portion that extends from said outer race portion, said plurality of balls provide a driving connection between said inner race and said outer race portion of said unitary outer race and splined member;

a second stub shaft having a first end that is connected for rotation with and for axial movement relative to said splined portion of said unitary outer race and splined member and a second end; and a second driveshaft section connected for rotation with said second end of said second stub shaft.

14. The compound driveshaft assembly defined in claim 13 wherein said second end of said first stub shaft has a splined portion that is connected to said inner race of said constant velocity universal joint.

15. The compound driveshaft assembly defined in claim 13 wherein said first end of said second stub shaft has a splined portion that is connected to said splined portion of said unitary outer race and splined member.

16. The compound driveshaft assembly defined in claim 13 wherein said splined portion of said unitary outer race and splined member includes a female splined portion that extends from said outer race portion.

17. The compound driveshaft assembly defined in claim 16 wherein said second stub shaft is connected between said female splined portion of said unitary outer race and splined member and said second driveshaft section.

18. The compound driveshaft assembly defined in claim 17 wherein said first end of said second stub shaft has a male splined portion that is connected to said female splined portion of said unitary outer race and splined member.

* * * * *